June 20, 1967  D. J. VALLEY  3,327,184
WOUND CAPACITOR AND METHOD OF MAKING
Filed Dec. 13, 1965  2 Sheets-Sheet 1
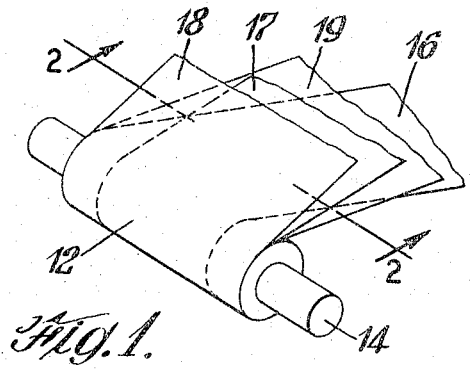
*Fig. 1.*
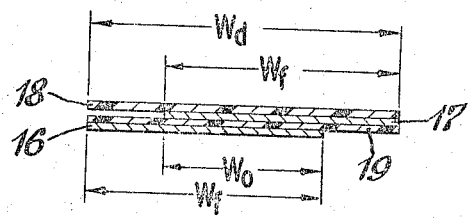
*Fig. 2.*
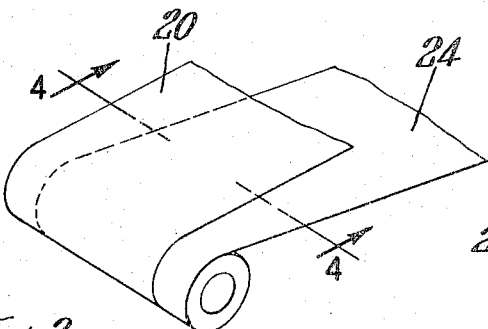
*Fig. 3.*
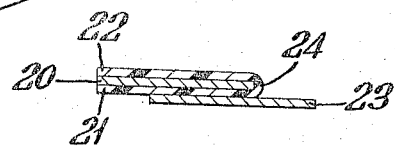
*Fig. 4.*
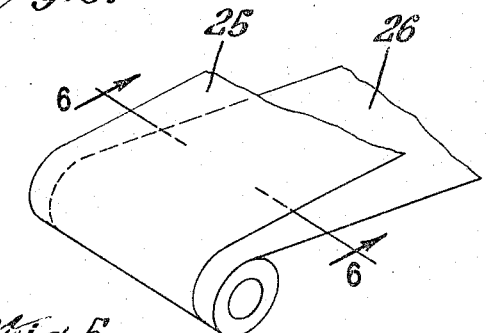
*Fig. 5.*
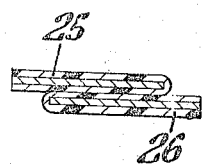
*Fig. 6.*
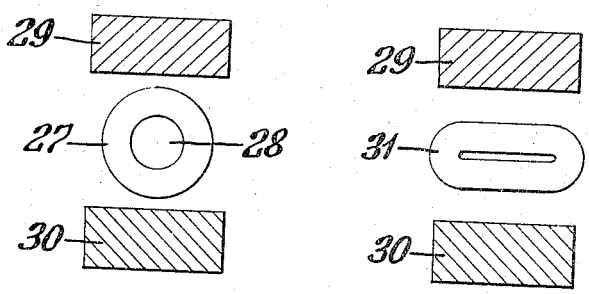
*Fig. 7.*  *Fig. 8.*
INVENTOR.
DAVID J. VALLEY
BY Leo A. Plum, Jr.
ATTORNEY

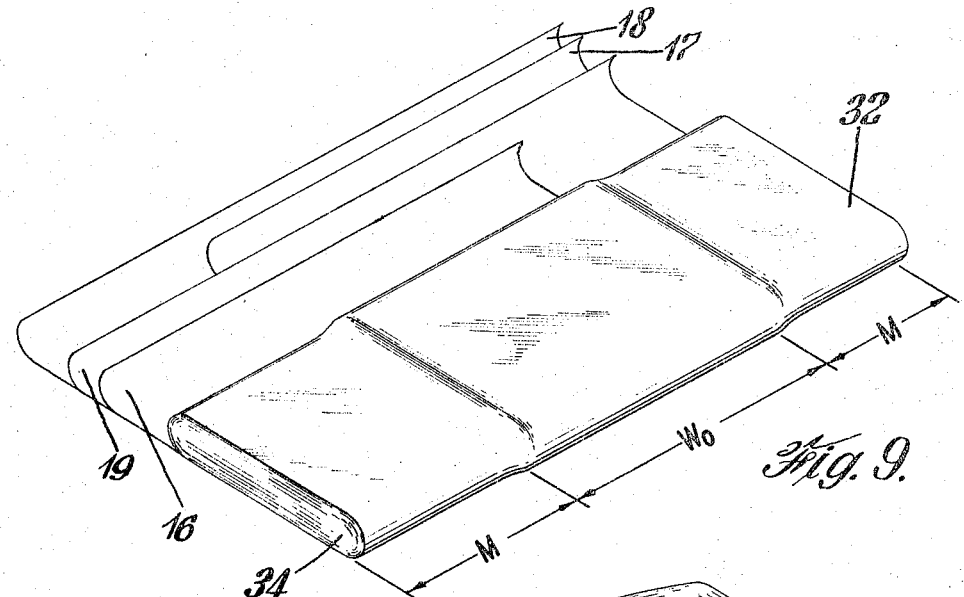
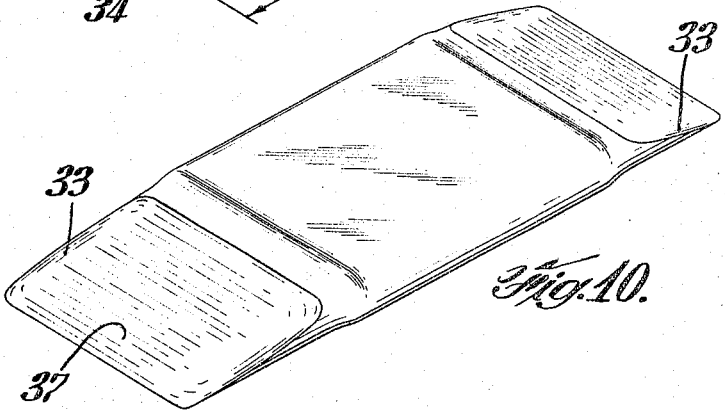
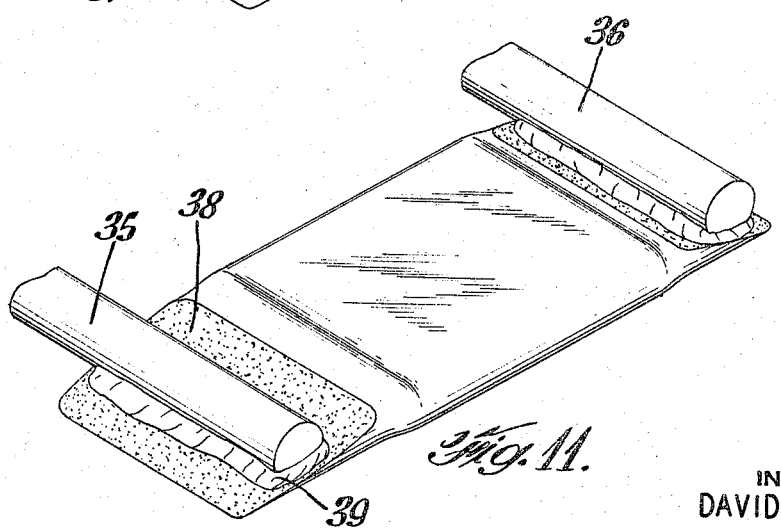

United States Patent Office
3,327,184
Patented June 20, 1967

3,327,184
WOUND CAPACITOR AND METHOD OF MAKING
David J. Valley, Cleveland, Ohio, assignor to Union
Carbide Corporation, a corporation of New York
Filed Dec. 13, 1965, Ser. No. 513,446
13 Claims. (Cl. 317—258)

This invention relates to an improved electric capacitor of the wound type and to a process for making such a capacitor.

Wound capacitors are generally made by winding interleaved strips of metal foils and dielectric strips to form a tubular coil or cylinder. The metal foils can have a width less than that of the dielectric strip with the edges of the two metal foils disposed at opposite ends of the coil so that the two foils overlap only in a central portion of the tube. The foil turns at one end of the tube can then be utilized in forming one electrode connection to the capacitor and those turns at the opposite end of the tube can be used to make a connection to the other electrode of the capacitor. The central portion of the tube where the foils overlap determines the effective plate area of the capacitor.

In one method for attaching electrical leads to the ends of a wound capacitor tube, the ends are generally plated with a solder or solder-like material making an electrical connection to the turns of foil at each end of the coil. Lead wires are then connected at these soldered areas.

It has been found that the connection of lead wires to the relatively small ends of a capacitor tube is a critical step in the fabrication of these devices. A good electrical as well as a strong mechanical connection requires that the soldered connection be of an appropriate size. The area available for this is of course limited depending on the dimensions of the capacitor involved. Miniature wound capacitors of low capacitance are particularly difficult to produce because of this problem.

It is the primary object of this invention therefore to provide a method for more effectively attaching electrical lead wires to wound capacitors.

It is also an object of this invention to provide wound capacitors having electrical lead wire connections of high strength and which make good electrical contact.

It is a further object of this invention to provide an improved miniature capacitor and method for its production which overcomes the existing difficulties experienced in making electrical connections to such miniature devices.

Other aims and advantages of this invention will be apparent from the following description, the drawings and the appended claims.

According to the present invention a process is provided for making a wound capacitor comprising winding foil electrodes interleaved with dielectric films to form a wound unit, cutting through the wound unit at each end thereof on a bias or diagonal to expose the foil turns and to provide a larger area for electrical lead wire termination at either end of the unit than the normal cross-sectional area of the unit.

In the drawings:

FIG. 1 is a perspective view illustrating the relative positions of the interleaved foil strips and dielectric strips as they are wound on a mandrel;

FIG. 2 is a sectional view of the strips shown being wound in FIG. 1;

FIG. 3 is a perspective view illustrating the use of foil strips as the electrodes in a wound capacitor, wherein one of the foil strips had been previously provided with a coating of a dielectric material on each side, said coatings forming the dielectric films separating the foils;

FIG. 4 is a sectional view of the foil strips shown in FIG. 3 wherein one foil strip is provided with dielectric coatings on each side;

FIG. 5 is a perspective view of a wound capacitor wherein both foil electrode strips were first coated on both sides with dielectric material;

FIG. 6 is a sectional view of the dielectric coated foil strips shown being wound in FIG. 5;

FIG. 7 is an end view of a wound capacitor unit having a hollow core and positioned between the jaws of a press;

FIG. 8 is an end view of the capacitor unit shown in FIG. 7 after it has been flattened to substantially eliminate the hollow core;

FIG. 9 is a perspective view of a flattened wound capacitor unit showing the interleaved strips of foil and dielectric;

FIG. 10 is a perspective view of the flattened unit shown in FIG. 9 after the ends of the unit were cut on a bias or diagonal to expose the foil turns and provide a larger area for electrical lead wire termination than the normal cross-sectional area of the unit.

FIG. 11 is a perspective view of the flattened capacitor with its ends cut on a bias and with electrical lead wires shown connected to the relatively large connection area by solder.

Referring to FIG. 1, a wound capacitor 12 is shown being wound on a mandrel 14. Alternate strips 16 and 17 of foil are interleaved with strips 18 and 19 of dielectric material. As seen in FIGS. 1 and 2, the metallic foils 16 and 17 each have a width $W_F$ less than the width $W_D$ of each of the dielectric strips 18 and 19. The edges of the foils 16 and 17 are arranged at opposite edges of the dielectric strips 18 and 19 so that the metal foils overlap in a central portion $W_O$ of the unit thereby providing the effective capacitive area of the unit. The external, nonoverlapping portions of the foils are used for the electrical lead wire connection. One terminal wire is connected to the right hand margin of foil 17 and the other terminal wire is connected to the left hand margin of foil 16.

The conductive foils 16 and 17 may be aluminum, copper, steel, or any other suitable metal. The dielectric films 18 and 19 shown in FIG. 1 and FIG. 2 are thin sheets or strips of electrical insulating materials such as paper or plastic films. Thin plastic films composed of polystyrene, polypropylene, polytetrafluoroethylene, polyesters, polycarbonates, cellulose triacetate, and other organic materials can be made for this purpose.

The dielectric layer need not be present as a separate sheet. A film of dielectric material can be bonded to the foil surface or a thin film of organic dielectric material can be cast or vapor deposited on one or both sides of the metal foil. A particularly useful dielectric material of this type is poly-para-xylylene polymer which can be vapor deposited onto the metal foils in very thin uniform films.

FIGS. 3 to 6 illustrate the use of dielectric coated metal foils as described above. In FIGS. 3 and 4 a strip of foil 20 is shown coated on both sides, 21 and 22, with an organic dielectric material. The second foil 23 need not be coated with the dielectric material since the coatings on both sides of foil 20 afford the necessary dielectric separation between the foils. The two foils are shown being wound in a partially overlapping relationship to provide the free margins for each foil strip at the ends of the capacitor. The plastic-coated foil 20 can be slit at its exposed edge to expose the foil while the interior edge 24 of this foil is left coated with plastic.

FIGS. 5 and 6 show the use of two foils 25 and 26 each coated on both sides with organic dielectric material. These foils could have been formed by slitting down the middle a wide strip of plastic-coated foil and disposed one half 25 of the foil over the other half 26 in the illustrated overlapping manner with the plastic-coated edges inside the coil and the exposed, slit edges at the outsides of the coil. The use of foil strips coated on both sides gives a double thickness of dielectric film between alternate foils.

In the wound capacitors shown in the drawings and described above, some of the dielectric materials used were actually free films, sheets or strips of dielectric materials. In other cases, such as in FIGS. 3 to 6 the dielectric separation between the foils was actually a coating or film of plastic bonded or formed on one or both surfaces of the metal foil. In still other cases, the metal electrodes may be formed as metallized films deposited on strips of dielectric material, such as polyester tape. For the purposes of the description of this invention the term foil shall mean a metallic electrode component in a wound capacitor, whether it is a free sheet or foil of metal or a deposited film of metal. Similarly the term dielectric film shall mean herein a layer, strip or film of dielectric material, whether in the form of a separate or bonded strip or sheet or a vapor deposited, cast or otherwise applied coating on a metal foil. Additionally the step of winding foil electrodes interleaved with dielectric films shall mean the process of forming a tube or coil of alternate foils separated by dielectric films using any of the materials and processes described herein whether the foils and films are free strips or are bonded or deposited one on the other, or any combination of these materials and steps.

In FIG. 7 a wound capacitor tube or coil 27 is shown after the mandrel 14 has been removed leaving a hollow core 28. The coil is inserted between two flat surfaces 29 and 30 which are then pressed together to flatten the coil as at 31 in FIG. 8 and reduce or eliminate the hollow core.

In FIG. 9 the flattened wound capacitor unit 32 is shown. This unit was constructed of alternate foils 16 and 17 interleaved with separate strips of dielectric material 18 and 19, as previously shown in FIG. 1. The overlapping width $W_O$ of the foils is the effective capacitor plate area. The margins M at each end represent the non-overlapping ends of each foil and are generally wider than in conventional wound capacitors. In FIG. 10 these margins are shown after having been cut or ground on the bias, i.e., on a diagonal. The angle of the diagonal cut is made small in reference to the horizontal plane so that the area 33 of the cut is larger than the cross-sectional area of the end 34 of the flattened wound capacitor 32 of FIG. 9. As seen in FIG. 11, the larger area 33 of the capacitor foils exposed by the diagonal cut allows ample space for the soldering of electrical lead wires 35 and 36. It would be very difficult to attach lead wires such as 35 and 36 to the normal end surface 34 of a flattened wound capacitor of this type.

While the process of this invention is useful in regard to making capacitors of any size, it is especially suited for the production of miniature capacitors having low capacitance values. Such units can be made by winding only a few turns of alternate foils interleaved with dielectric films around a mandrel with only a small overlapping of the foils. Capacitors can thus be formed with as low a capacitance as is desired. The difficulties experienced in the past in making electrical lead wire connections to such small devices are solved by the present invention. The alternate foils interleaved with dielectric films are wound on a relatively large mandrel with a narrow overlapping foil area and relatively wide margins at each end. The wound coil is removed from the mandrel, and after flattening, the ends are cut or ground on the diagonal to expose the foil turns and provide the relatively large areas for lead wire attachment. Using the method of this invention, capacitors can be formed having only one turn of active capacitor winding. Such a capacitor might have a cross-sectional area normal to the axis of the unit of less than 0.001 square inch, which is too small for effective lead wire connection. By cutting or grinding the margin ends at a low angle on the bias or diagonal, the contact area can be increased to 0.01 square inch, which is sufficiently large to allow for a strong solder connection with the lead wires. In addition to providing a good mechanical bond, the method of this invention insures a direct electrical contact to each turn of the foil, reducing the contact resistance and improving the electrical performance. Capacitors made by this method exhibit low dissipation factor and stable high frequency characteristics.

More specifically the manner of producing capacitors according to this invention is as follows: foils coated with a suitable organic dielectric such as vapor-deposited poly-paraxylylene are wound on a mandrel about 0.1 inch in diameter as previously described and illustrated. The foils are wound, for example, so as to have an overlapping central portion of ¼ inch with margins on each end of ¹⁄₁₆ or ⅛ inch width. The wound capacitor tube is removed from the mandrel and flattened using moderate pressure. It is to be understood that the flattened capacitor unit can be produced by other processes than winding on a cylindrical mandrel followed by flattening. However this process is particularly convenient.

The flattened capacitor unit may then be dried by heating, for example, at a temperature of about 130° C. for at least one-half hour and then subjected to an impregnation step whereby an impregnant is forced into whatever voids and spaces exist between the windings of the capacitor. The wound capacitors can be impregnated with any suitable impregnant followed by heating to set the impregnant, if necessary.

The impregnated capacitors are then prepared for grinding by first mounting them on a surface, for example, a flat aluminum bar of the same width as the capacitors. A strip of pressure sensitive doubly coated tape is attached to the bar and a row of spaced-apart capacitors are attached to the tape so that the ends of the capacitors are lined up with the edge of the aluminum bar. The ends or margins of the capacitors can be ground using a belt sander for example, to make the low angle diagonal surface 33 shown in FIG. 10. Care should be taken to avoid grinding of any of the central capacitive area of the device.

As shown in FIG. 10, the turns 37 of the foil are now exposed. This exposed surface 33 is prepared for soldering by flame spraying a copper coating 38 thereon as shown in FIG. 11. The lead wires 35 and 36 can now be attached to the sprayed copper surface with a small amount of solder 39. The lead wires can be tinned nickel of about 0.025 inch diameter with ¼ inch on one end flattened to about ½ diameter.

The finished capacitor can now be encapsulated by any of the conventional methods, such as wax dipping, resin dipping, plastic dipping, or potting in a molded container.

The angle at which the ends of the capacitor should be ground or cut is the angle which will expose at least enough surface area to provide for a good electrical connection. This surface area will be larger than the cross-sectional area of the capacitor in a plane normal to the axis of the capacitor. The angle at which the ends are cut or ground is sloped from the interior of the capacitor down towards the end thereof as shown in FIGS. 10 and 11 of the drawings. It is to be understood that the use of the term grinding of the ends of the capacitor on a diagonal also includes the step of cutting, shaving or any other material removal process whereby the foil edges are exposed in the diagonal manner described herein.

What is claimed is:
1. The process for making a wound capacitor comprising winding alternate foil electrodes interleaved with dielectric films to form a wound capacitor unit with the outer edges of the turns of one foil electrode disposed at one end of the capacitor and the outer edges of the turns of the other foil electrode disposed at the opposite end of the capacitor with a region therebetween wherein the foil electrodes overlap, grinding each end of the capacitor at a diagonal to expose edges of the foil electrode at that end and to provide a larger area of exposed foil edges for connection thereto of electrical lead wires than the normal cross-sectional area of the capacitor unit, and attaching electrical lead wire connections to the exposed foil edges at each end of the capacitor.

2. The process of claim 1 in which the capacitor is wound in the form of a coil having a hollow core, and then flattened to substantially eliminate the hollow core before grinding of the ends thereof.

3. The process of claim 2 in which the interior of the flattened wound capacitor is impregnated with an impregnant before grinding of the ends thereof.

4. The process of claim 3 in which the exposed surfaces of the ground ends of the capacitor are flame sprayed with a metallic coating before the electrical lead wires are attached thereto.

5. The process of claim 4 in which the exposed surfaces of the ground ends of the capacitor are flame sprayed with copper and electrical lead wires are solder over the copper at each end of the capacitor.

6. The process of claim 5 in which the electrical lead wires are soldered with the lead wire arranged transverse to the long axis of the capacitor.

7. A wound capacitor comprising a unit wound about a longitudinal axis and composed of at least a pair of foil electrodes interleaved with dielectric films with the outer edges of one foil substantially all disposed at one end of the capacitor with said edges lying substantially in a single plane forming an angle of less than 90° with the longitudinal axis of the wound capacitor, and the outer edges of the other foil electrode substantially all disposed at the opposite end of the capacitor with said edges lying substantially in another single plane forming an angle of less than 90° with the longitudinal axis of the capacitor, a region between said ends of the capacitor wherein all of the foil electrodes overlap, and electrical lead connections to the exposed foil edges at the inclined plane surfaces at each end of the capacitor.

8. The wound capacitor of claim 7 in which the capacitor has the form of a flattened wound coil.

9. The wound capacitor of claim 8 in which any interior spaces between the windings of the flat capacitor are occupied by an impregnant.

10. The capacitor of claim 9 in which the exposed surfaces of the ground ends of the capacitor are intimately covered with a copper coating.

11. The capacitor of claim 10 in which electrical lead wires are solder connected to the copper covered surfaces of the ground ends of the capacitors.

12. The capacitor of claim 11 in which the dielectric films are poly-para-xylylene polymer.

13. The capacitor of claim 12 in which the electrical lead wires are solder connected to the copper covered surfaces of the ground ends of the capacitor with the lead wires arranged transversely to the long axis of the capacitor.

References Cited

UNITED STATES PATENTS

| | | | |
|---|---|---|---|
| 2,232,320 | 2/1941 | Georgiev | 317—260 X |
| 3,134,059 | 5/1964 | Rayburn | 317—260 |

FOREIGN PATENTS 619,364  3/1949  Great Britain.

OTHER REFERENCES

Dorn: German printed app. No. 1,117,217, publ. November 1961.

LEWIS H. MYERS, *Primary Examiner.*

E. GOLDBERG, *Assistant Examiner.*